(12) United States Patent
Snell et al.

(10) Patent No.: US 10,079,468 B2
(45) Date of Patent: Sep. 18, 2018

(54) HYBRID RESONATOR AND AMPLIFIER COMBINATION FOR GENERATING HIGH ENERGY OUTPUT SIGNAL

(71) Applicant: BAE SYSTEMS INFORMATION AND ELECTRONIC SYSTEMS INTEGRATION INC., Nashua, NH (US)

(72) Inventors: Katherine J. Snell, Nashua, NH (US); John C. McCarthy, Hampton, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 15/374,153

(22) Filed: Dec. 9, 2016

(65) Prior Publication Data

US 2018/0166848 A1     Jun. 14, 2018

(51) Int. Cl.

| H01S 3/108 | (2006.01) |
| H01S 3/109 | (2006.01) |
| H01S 3/16 | (2006.01) |
| H01S 3/083 | (2006.01) |
| H01S 3/23 | (2006.01) |
| H01S 3/08 | (2006.01) |

(52) U.S. Cl.
CPC ............ *H01S 3/1083* (2013.01); *H01S 3/083* (2013.01); *H01S 3/08054* (2013.01); *H01S 3/1095* (2013.01); *H01S 3/1675* (2013.01); *H01S 3/2316* (2013.01)

(58) Field of Classification Search
CPC .. H01S 3/1083; H01S 3/08054; H01S 3/2316; H01S 3/1675; H01S 3/1095; H01S 3/083
See application file for complete search history.

(56) References Cited

U.S. PATENT DOCUMENTS

| 4,884,277 A | * | 11/1989 | Anthon | ................... H01S 3/109 372/21 |
| 4,941,147 A | * | 7/1990 | Bhowmik | ............... H01S 3/083 372/37 |
| 5,696,781 A | * | 12/1997 | Hyuga | ................... H01S 3/109 372/21 |

(Continued)

Primary Examiner — Xinning Niu
(74) Attorney, Agent, or Firm — Davis & Bujold, PLLC (57) ABSTRACT

A hybrid resonator and amplifier combination for generating a high energy output signal. The combination comprises a beam splitter for splitting a pump laser beam into first and second portions. The second portion beam being conveyed to a resonator which operates in a single transverse mode to generating a signal wavelength beam. An output coupler of the resonator allows a first portion of the signal wavelength beam to pass therethrough while retaining a second portion of the signal wavelength beam within the resonator. A system dichroic mirror receives and directs both the first portion and the signal wavelength beam toward an amplifier. The amplifier receives both the first portion and the signal wavelength beam. The first portion, upon passing through the amplifier, creates gain which is used by the amplifier to amplify the signal wavelength beam generate the high energy output signal.

20 Claims, 4 Drawing Sheets

(56) References Cited

U.S. PATENT DOCUMENTS

2008/0239317 A1* 10/2008 Schulkin .................. G01J 4/00
356/365
2016/0099540 A1* 4/2016 Chuang .............. G01N 21/9501
356/237.2

* cited by examiner

HYBRID RESONATOR AND AMPLIFIER COMBINATION FOR GENERATING HIGH ENERGY OUTPUT SIGNAL

FIELD

The present disclosure relates to improvements concerning high energy optical parametric frequency convertors in order to improve the quality of the transmitted beam.

BACKGROUND

Figure 3:
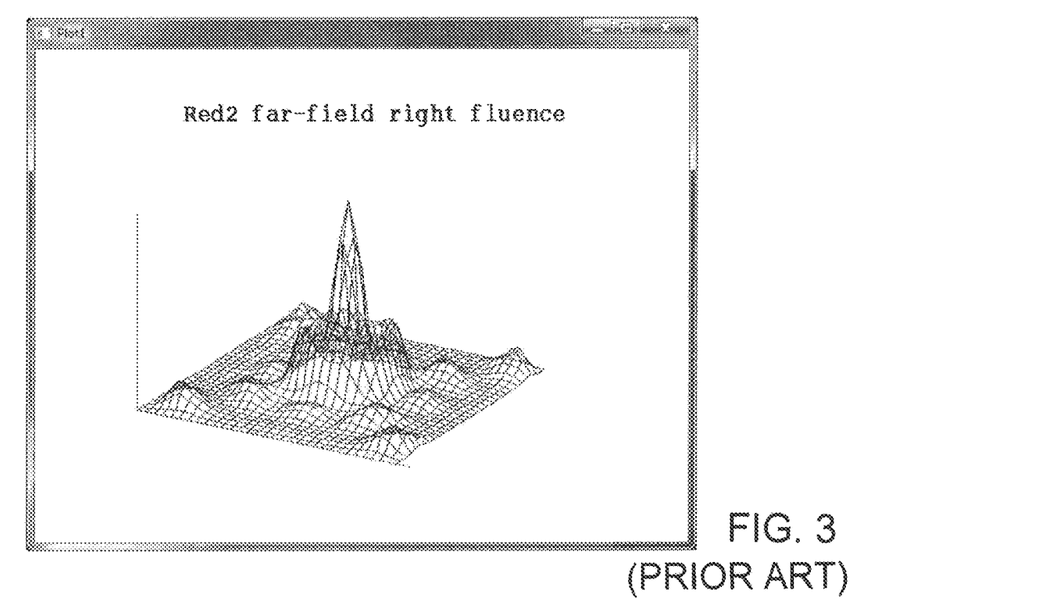
FIG. 3 is a diagrammatic view showing a red2 far-field right fluence according to the prior art.

It is to be appreciated that high energy Optical Parametric Oscillator (OPO) frequency convertors typically suffer from poor beam quality due to the need for large pump spot sizes in order to prevent optical damage to the crystals. The poor beam quality, an example of which is generally shown in FIG. 3, in turn, limits the useful range of Light Detection and Ranging (LIDAR) systems and/or requires the use of large optics thereby increasing the overall size, weight and associated cost of the electro-optical system.

As is well known in the art, LIDAR is a surveying method that measures a distance to a target by illuminating that target with a laser beam or light. LIDAR is popularly used to make high-resolution maps, with applications in geodesy, geomatics, archaeology, geography, geology, geomorphology, seismology, forestry, atmospheric physics, laser guidance, Airborne Laser Swath Mapping (ALSM), and laser altimetry. LIDAR sometimes is called laser scanning and 3D scanning and has terrestrial, airborne, and mobile applications.

SUMMARY

Wherefore, it is an object of the present disclosure to provide a high brightness optical parametric frequency convertor which has reduced size, reduced weight and relatively low manufacturing cost while still capable of generating a laser beam of high output quality.

Another object is to split the pump laser beam of the optical frequency convertor into both a low energy, high brightness OPO beam with a resonator Fresnel number of less than 1 and a high energy Optical Parametric Amplifier (OPA) which is then utilized to amplify the OPO seed beam in order to generate a high energy diffraction limited output.

A further object is to utilize an OPO cavity which forms a stable resonator, either employing a standing wave (linear) or a travelling wave (ring) resonator configuration. It is to be appreciated that the ring resonator configuration allows for a longer cavity length (e.g., permits a lower Fresnel number) generally within a smaller foot print than a linear resonator configuration.

Another object is to improve the beam quality, e.g., by greater than 10 times, while still maintaining a high conversion efficiency and a high energy output of the laser beam.

Yet another object is to provide a diffraction limited operation which has an eye-safe OPO/OPA with an energy output of greater than 100 mJ which is useful for long range LIDAR transmitter applications, e.g., LIDAR transmitter applications ranges greater than 10 km.

Another object is to provide a high brightness parametric convertor which is applicable for scientific and medical laser applications as well as a variety of other applications so that the invention is applicable to a wide range of parametric convertor applications without requiring special optics (unstable resonator or image rotation) or special crystal or resonator geometries (critical phase matching, image rotation).

Still another object is to provide an OPO resonator that has physical cavity length of about 120 mm or so and utilizes a 20 mm crystal.

A further object is to provide a hybrid resonator/amplifier system as a modular component so that the hybrid resonator/amplifier system module can be installed on a currently existing laser system and utilized to improve be beam quality thereof.

A Fresnel number is commonly applied to optical resonators (cavities), in particular to laser resonators, and is determined by the equation:

$$F=a^2/L\lambda$$

where a is the radius of the end mirrors,
$\lambda$ is the wavelength, and
L is the resonator length.

A large Fresnel number (typically well above 1) of the resonator (cavity) means that diffraction losses at the end mirrors are small for typical mode sizes (i.e., not near a stability limit of the resonator, where mode sizes can diverge). This is the usual situation in a stable laser resonator. Conversely, a small Fresnel number means that diffraction losses at the end mirrors can be significant—particularly for higher-order modes, so that diffraction-limited operation may be favored.

Typically, most OPO resonators have a fairly large Fresnel number due to the desire to have a short cavity length for low threshold operation. However low threshold operation can be obtained with longer cavity lengths by using longer nonlinear crystal lengths.

The present disclosure also relates to a hybrid resonator and amplifier combination for generating a high energy output signal, the hybrid resonator and amplifier combination comprising: a beam splitter for splitting a pump laser beam into a first portion of the pump laser beam and a second portion of the pump laser beam; the second portion of the pump laser beam being propagated to an OPO resonator having at least one crystal, and the resonator operating in a single transverse mode for generating, from the second portion of the pump laser beam, both a signal wavelength beam and an idler wavelength beam, and the resonator having an output coupler which allows a first portion of the signal wavelength beam to pass therethrough while retaining a second portion of the signal wavelength beam within the resonator; a system dichroic mirror for receiving and directing both the first portion of the pump laser beam and the first portion of the signal wavelength beam toward an amplifier; and the amplifier, having at least one crystal, being arranged for receiving both the first portion of the pump laser beam and the first portion of the signal wavelength beam, and the first portion of the pump laser beam, upon passing through the amplifier, creating gain within the amplifier, and the amplifier amplifying the first portion of the signal wavelength beam, with the gain created from the first portion of the pump laser beam, to generate the high energy output signal.

The present disclosure also relates to a method of generating a high energy output signal with a hybrid resonator and amplifier combination, the method comprising: splitting a pump laser beam, via a beam splitter, into a first portion of the pump laser beam and a second portion of the pump laser beam; propagating the second portion of the pump laser beam to a resonator having at least one crystal, and the resonator operating in a single transverse mode to generate, from the second portion of the pump laser beam, both a signal wavelength beam and an idler wavelength beam, and allows a first portion of the signal wavelength beam, via an output coupler of the resonator, to pass therethrough while retaining a second portion of the signal wavelength beam within the resonator; receiving and directing, via a system dichroic mirror, both the first portion of the pump laser beam and the first portion of the signal wavelength beam toward an amplifier; arranging at least one crystal in the amplifier for receiving both the first portion of the pump laser beam and the first portion of the signal wavelength beam; passing the first portion of the pump laser beam through the amplifier to create gain within the amplifier; and amplifying the first portion of the signal wavelength beam, with the gain created in the amplifier from the first portion of the pump laser beam, to generate the high energy output signal.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The present disclosure will be understood by reference to the following detailed description, which should be read in conjunction with the appended drawings. It is to be appreciated that the following detailed description of various embodiments is by way of example only and is not meant to limit, in any way, the scope of the present system.

Figure 1:
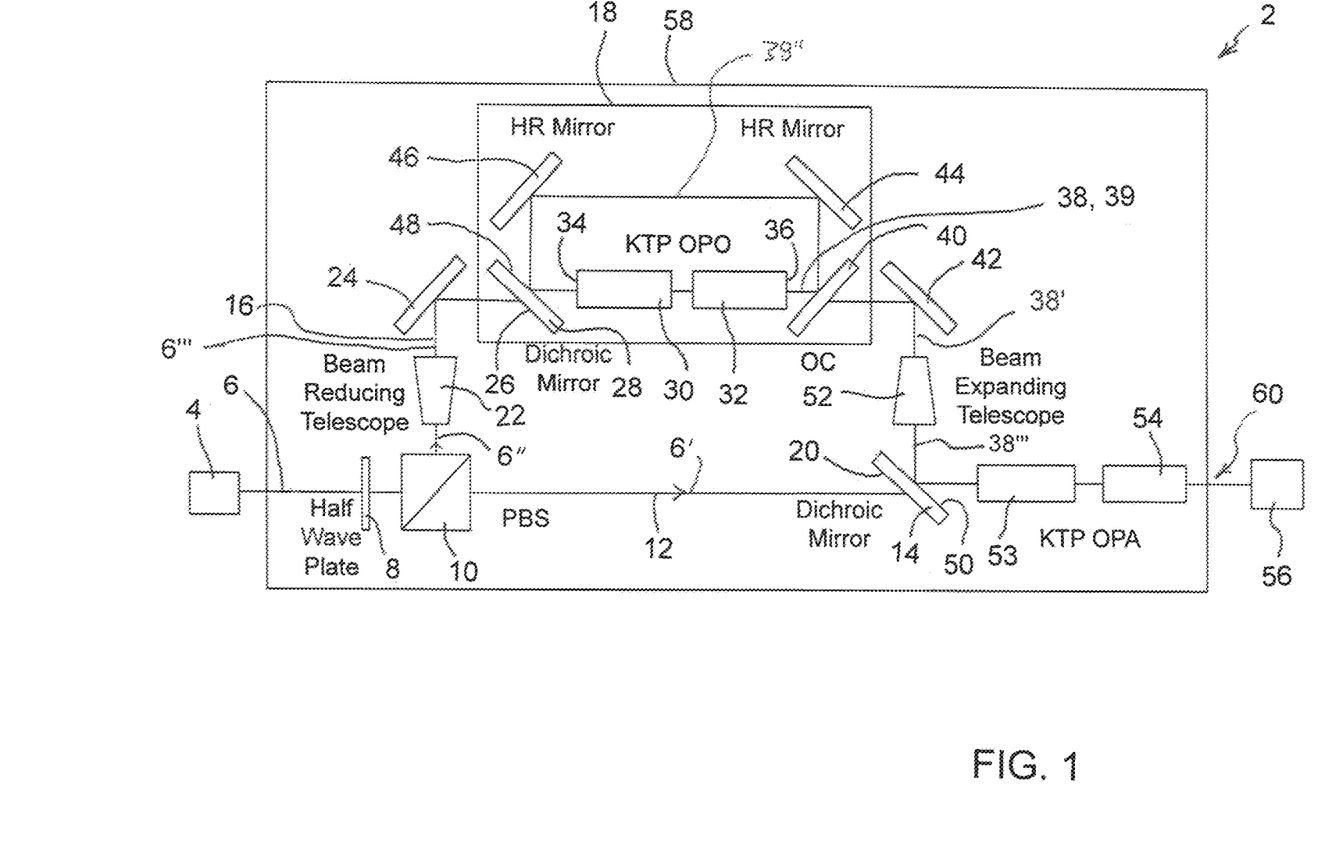
FIG. 1 is a diagrammatic drawing showing the various components of a first embodiment of a stable OPO/OPA hybrid electro-optical system having a ring resonator.

Turning now to FIG. 1, a brief description concerning a first embodiment of the stable OPO/OPA electro-optical system 2, according to the disclosure, will now be briefly discussed. As can be seen in this embodiment, the present disclosure relates to a resonator having an OPO/OPA design. As generally shown, a laser generator or source 4 is provided for generating a desired pump laser beam 6 having at a desired wavelength, e.g., 1064 nm in this example. The generated pump laser beam 6 then typically propagates though a half wave plate 8, which modifies the polarization of the pump laser beam 6 by introducing a phase change thereto. After passing through the half wave plate 8, the pump laser beam 6 then enters an input side of polarizing beam splitter 10 which splits the modified pump laser beam 6 into two separate polarized beams 6', 6".

A first portion of the polarized pump laser beam 6' that passes directly through the polarizing beam splitter 10 along a first OPA laser beam path 12 toward a system partially reflective mirror, a system beam splitter or a system dichroic mirror 14. The remaining second portion of the polarized pump laser beam 6" is reflected by the polarizing beam splitter 10 through a beam reducing telescope 22 along a second OPO laser beam path 16 that is substantially normal to first OPA laser beam path 12. The reflected second portion of the pump laser beam 6" is directed toward a ring resonator 18, the purpose and function of which will be discussed hereinafter in further detail.

The first portion of the (e.g., 1064 nm) pump laser beam 6', which passes through the polarizing beam splitter 10, eventually propagates along the first OPA laser beam path 12 to an inlet surface 20 of the system dichroic mirror 14. A further discussion concerning the purpose and function of this first portion of the pump laser beam 6 and the system dichroic mirror 14 will follow hereinafter.

As indicated above, the half wave plate 8 is located between the laser generator or source 4 and the polarizing beam splitter 10. The orientation of the wave plate 8 is typically adjustable or rotatable by an operator (e.g., either manually or by automated actuation of an adjustment member (not shown) coupled to the half wave plate 8), in order to adjust the amount of the pump laser beam 6 which is permitted to pass through the polarizing beam splitter 10 and propagate as the first portion of the pump laser beam 6' along the first OPA laser beam path 12 toward the inlet surface 20 of the system dichroic mirror 14, as well as to adjust the amount of the pump laser beam 6 which is reflected, by the polarizing beam splitter 10, along the second OPO laser beam path 16 as the second portion of the pump laser beam 6" toward the ring resonator 18. Typically, the half wave plate 8 is adjustable so as to permit anywhere between 0-100% of the pump laser beam 6 to propagate and pass through the polarizing beam splitter 10 as the first portion of the pump laser beam 6' and propagate along the first OPA laser beam path 12 and correspondingly permit anywhere between 100-0% of the pump laser beam 6 to be reflected, by the polarizing beam splitter 10, as the second portion of the pump laser beam 6" and propagate along the second OPO laser beam path 16 toward the ring resonator 18.

It is to be appreciated that, if desired or necessary, a beam expanding telescope (not shown) may be located between the laser generator or source 4 and the half wave plate 8, for example, in order to modify or expand the size of the pump laser beam 6, prior to the pump laser beam entering into the half wave plate 8 or the polarizing beam splitter 10.

After being reflected by the polarizing beam splitter 10, the second portion of the pump laser beam 6" propagates along the second OPO laser beam path 16 and passes through a beam reducing telescope (beam reducer) 22, where a size, e.g., a diameter, of the second portion of the pump laser beam 6" is focused, concentrated or demagnified, e.g., reduce in size or diameter by four times for example to be about ¼ of its initial size or diameter, before the second portion of the focused pump laser beam 6''' is directed toward and reflected by a first highly reflective system mirror 24. That is, the beam reducing telescope 22 demagnifies, decreases or focuses the diameter of the second portion of the pump laser beam 6", supplied along the second OPO laser beam path 16, in order to create a small spot in the OPO which supports only a single transverse mode which thereby increases the brightness of the beam.

The first highly reflective system mirror 24 is arranged at about a 45 degree angle with respect to the second OPO laser beam path 16. The first highly reflective system mirror 24 reflects substantially all of the supplied and focused second portion of the (1064 nm) pump laser beam 6''' toward the ring resonator 18. The supplied and focused second portion of the (1064 nm) pump laser beam 6''', which is reflected by the first highly reflective system mirror 24, then propagates toward and enters an inlet surface 26 of a resonator partially reflective mirror, a resonator beam splitter or a resonator dichroic mirror 28. The resonator dichroic mirror 28 permits substantially all of the supplied and focused second portion of the (1064 nm) pump laser beam 6''' to pass therethrough and propagate toward a pair of first and second sequentially arranged potassium titanyl phosphate (KTP) crystals 30, 32 of the ring resonator 18. According to this embodiment, each of the crystals 30, 32 measures 7 mm×7 mm×20 mm. The resonator dichroic mirror 28 is arranged at a 45 degree angle with respect to the supplied and focused second portion of the (1064 nm) pump laser beam 6'' reflected by the first (1064 nm) highly reflective system mirror 24.

The supplied and focused second portion of the (1064 nm) pump laser beam 6''' then enters into an inlet surface 34 of the first crystal 30, of the pair of sequentially or serially arranged crystals, and then the supplied and focused second portion of the (1064 nm) pump laser beam 6'' propagates through both the first and the second crystals 30, 32, of the pair of sequentially arranged crystals. As the supplied and focused second portion of the (1064 nm) pump laser beam 6'' passes through both the first and the second crystals 30, 32, the supplied and focused second portion of the (1064 nm) pump laser beam 6''' is converted, in a conventional manner, into both (1) a signal wavelength beam, e.g., having a wavelength of about 1570 nm for example, and (2) an idler wavelength beam, e.g., having a wavelength of about 3300 nm for example. The combined signal wavelength beam and the idler wavelength beam 38, 39 then both exit from an outlet surface 36 of the second crystal 32, of the pair of sequentially arranged crystals, and propagate toward an output partially reflective mirror or output coupler 40.

The output coupler 40 is designed to allow a first portion (e.g., 1570 nm) signal wavelength beam 38', e.g., typically between 10 to 90% and more preferably about 40% or so, to pass therethrough and propagate toward a second (1570 nm) highly reflective system mirror 42 while reflecting a second portion (e.g., 1570 nm) signal wavelength beam 38'', e.g., 90 to 10% and more preferably about 60% or so, toward a first (1570 nm) highly reflective resonator mirror 44. In order to accomplish this, the output coupler 40 is typically arranged at a 45 degree angle with respect to the propagation path of at least the signal wavelength beam (and typically the idler wavelength beam) 38 propagating from the outlet surface 36 of the second crystal 32.

The first (1570 nm) highly reflective resonator mirror 44 is arranged at a 45 degree angle with respect to the propagation path of at least the second portion signal wavelength beam 38'' propagating from the output coupler 40. The first (1570 nm) highly reflective resonator mirror 44 reflects substantially all of the (e.g., 1570 nm) second portion signal wavelength beam 38'' toward a second (1570 nm) highly reflective resonator mirror 46.

The second (1570 nm) highly reflective resonator mirror 46 is arranged at a 45 degree angle with respect to the propagation path of at least the second portion signal wavelength beam 38'' reflected from the first (1570 nm) highly reflective resonator mirror 44. The second (1570 nm) highly reflective resonator mirror 46, in turn, then reflects substantially all of the second portion (e.g., 1570 nm) signal wavelength beam 38'' toward an outlet/reflective surface 48 of the resonator dichroic mirror 28.

The outlet/reflective surface 48 of the resonator dichroic mirror 28 then reflects substantially all of the second portion signal wavelength beam 38'' toward the first and second pair of crystals 30, 32 along with additional supplied and focused second portion of the (1064 nm) pump laser beam 6''' which propagates through the resonator dichroic mirror 28 toward the first and second pair of crystals 30, 32.

The above process is continuously repeated so that additional supplied and focused second portion of the (1064 nm) pump laser beam 6'' propagates into the ring resonator 18 through the resonator dichroic mirror 28 while only a (minor) portion, e.g., typically less than half, of the (e.g., 1570 nm) signal wavelength beam is permitted to pass through the output coupler 40 and exit from the ring resonator 18 as the first portion (e.g., 1570 nm) signal wavelength beam 38' while a major portion, e.g., typically more than half, of the (e.g., 1570 nm) signal wavelength beam remains circulating within the ring resonator 18 as the second portion signal wavelength beam 38''.

It is to be appreciated that the generated idler wavelength beam 39, e.g., the beam having a wavelength of about 3300 nm for example, gradually dissipates from or is eventually absorbed or removed from the ring resonator 18. That is, the generated idler wavelength beam 39 either passes through or is only partially reflected by one or more of the output coupler 40, the first (1570 nm) highly reflective resonator mirror 44, the second 1570 nm highly reflective resonator mirror 46 and/or the output/reflective surface 48 of the resonator dichroic mirror 28. As a result of this, the generated idler wavelength beam 39 is generally lost and removed from the ring resonator 18 while only a portion of the second portion signal wavelength beam 38'' propagates within the ring resonator 18 along a continuous loop.

As noted above, the first portion (e.g., 1570 nm) signal wavelength beam 38', which eventually passes through the output coupler 40, propagates toward the second (1570 nm) highly reflective system mirror 42 which reflects substantially all of the first portion (e.g., 1570 nm) signal wavelength beam 38' toward an outlet/reflective surface 50 of the system dichroic mirror 14. The second (1570 nm) highly reflective system mirror 42 is arranged at a 45 degree angle with respect to the propagation path of the first portion (e.g., 1570 nm) signal wavelength beam 38' which passes through the output coupler 40.

Prior to the first portion of the (e.g., 1570 nm) signal wavelength beam from the second (1570 nm) highly reflective system mirror 42 being reflected by the outlet/reflective surface 50 of the system dichroic mirror 14, the first portion (e.g., 1570 nm) signal wavelength beam 38' passes through a beam expanding telescope (beam expander) 52, e.g., where about a four times expansion in the size or diameter of the first portion of the (e.g., 1570 nm) signal wavelength beam 38' occurs. Thereafter, the expanded the first portion (e.g., 1570 nm) signal wavelength beam 38''' propagates toward the outlet/reflective surface 50 of the system dichroic mirror 14. As the first portion (e.g., 1570 nm) signal wavelength beam 38' passes through the beam expanding telescope 52, the first portion (e.g., 1570 nm) signal wavelength beam 38', generated by the ring resonator 18, is expanded or magnified in order to generate a beam which matches the size or diameter of the first portion of the (e.g., 1064 nm) pump laser beam 6' propagating from the polarizing beam splitter 10 along the first OPA laser beam path 12.

The outlet/reflective surface 50 of the system dichroic mirror 14 then reflects substantially all of the expanded first portion (e.g., 1570 nm) signal wavelength beam 38''' toward a pair of first and second sequentially arranged amplification crystals 53, 54, which form an OPA section of the system. In order to accomplish this, the outlet/reflective surface 50 of the system dichroic mirror 14 is arranged at a 45 degree angle with respect to both the first portion of the (e.g., 1064 nm) pump laser beam 6' propagating from the polarizing beam splitter 10 along the first OPA laser beam path 12 and the expanded (e.g., 1570 nm) signal wavelength beam 38''' propagating from the beam expanding telescope 52. As the expanded first portion (e.g., 1570 nm) signal wavelength beam 38''' is reflected by the outlet/reflective surface 50 of the system dichroic mirror 14, the expanded first portion (e.g., 1570 nm) signal wavelength beam 38''' is combined with the first portion of the (e.g., 1064 nm) pump laser beam 6' propagating from the polarizing beam splitter 10 along the first OPA laser beam path 12. This combined laser beam then propagates toward the first and the second sequentially arranged amplification crystals 53, 54 of the OPA section of the system.

Figure 4:
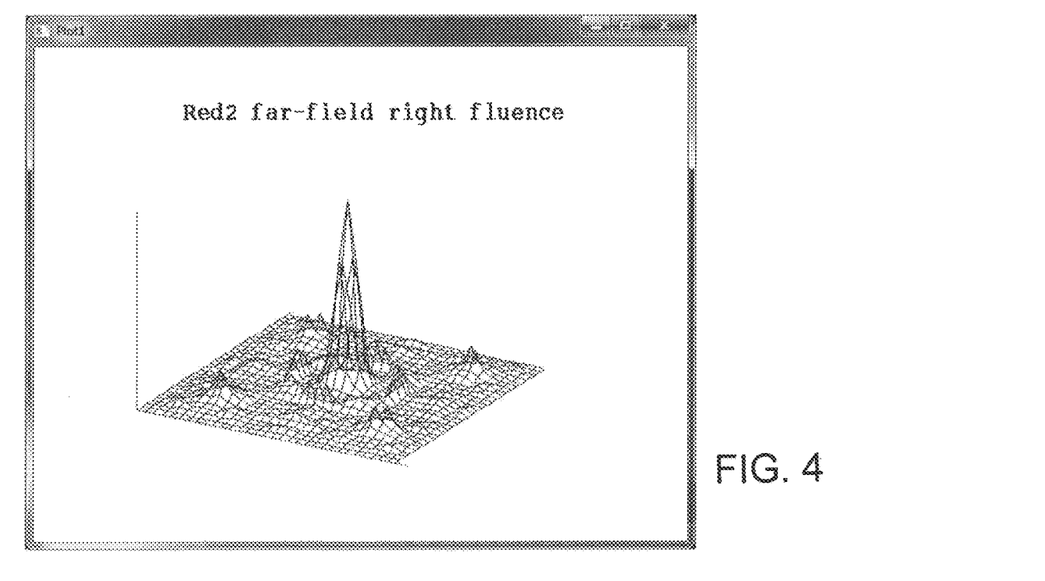
FIG. 4 is a diagrammatic view showing a red2 far-field right fluence which has a reduced diameter and improved brightness according to the present disclosure.

The combined laser beam then enters and propagates through the pair of first and second sequentially arranged amplification crystals 53, 54. As the first portion of the (e.g., 1064 nm) pump laser beam 6' propagates thought the pair of sequentially arranged amplification crystals 53, 54, the first portion of the (e.g., 1064 nm) pump laser beam 6' creates gain, in a conventional manner, within the pair of sequentially arranged amplification crystals 53, 54. The created gain is, in turn, then utilized by the pair of sequentially arranged amplification crystals 53, 54 in order to amplify the expanded first portion of the expanded (e.g., 1570 nm) signal wavelength beam 38''', generated by the ring resonator 18, as the expanded first portion of the (e.g., 1570 nm) signal wavelength beam 38''' propagates through the pair of sequentially arranged amplification crystals 53, 54. The amplification of the expanded first portion of the (e.g., 1570 nm) signal wavelength beam 38''' results in an improved beam having a gain that is typically on the order of about 10 times or greater than the quality of the expanded first portion of the (e.g., 1570 nm) signal wavelength beam 38'''. Such amplification of the expanded first portion of the (e.g., 1570 nm) signal wavelength beam 38''' thereby results in a high energy output signal, as generally shown in FIG. 4, for propagation toward a desired object or target 56.

As generally shown in FIG. 1, system can be designed a complete unitary module 58 which includes the half wave plate 8, the polarizing beam splitter 10, the system dichroic mirror 14, the beam reducing telescope 22, the first highly reflective system mirror 24, the ring resonator 18, the second (1570 nm) highly reflective system mirror 42, the beam expanding telescope 52, and the pair of sequentially arranged amplification crystals 53, 54. The module 58 can be used to modify an existing laser system in order to improve the beam quality of such existing system and thereby achieve a high energy output signal. Alternatively, the half wave plate 8, the polarizing beam splitter 10, the system dichroic mirror 14, the beam reducing telescope 22, the first highly reflective system mirror 24, the ring resonator 18, the second (1570 nm) highly reflective system mirror 42, the beam expanding telescope 52, and the pair of sequentially arranged amplification crystals 53, 54 may be incorporated, along with a laser generator or source 4 and an outlet aperture 60, for propagation of the high energy output signal toward a desired object or target 56, into a complete hybrid resonator and amplifier system 2, as generally shown in FIG. 1.

Figure 2:
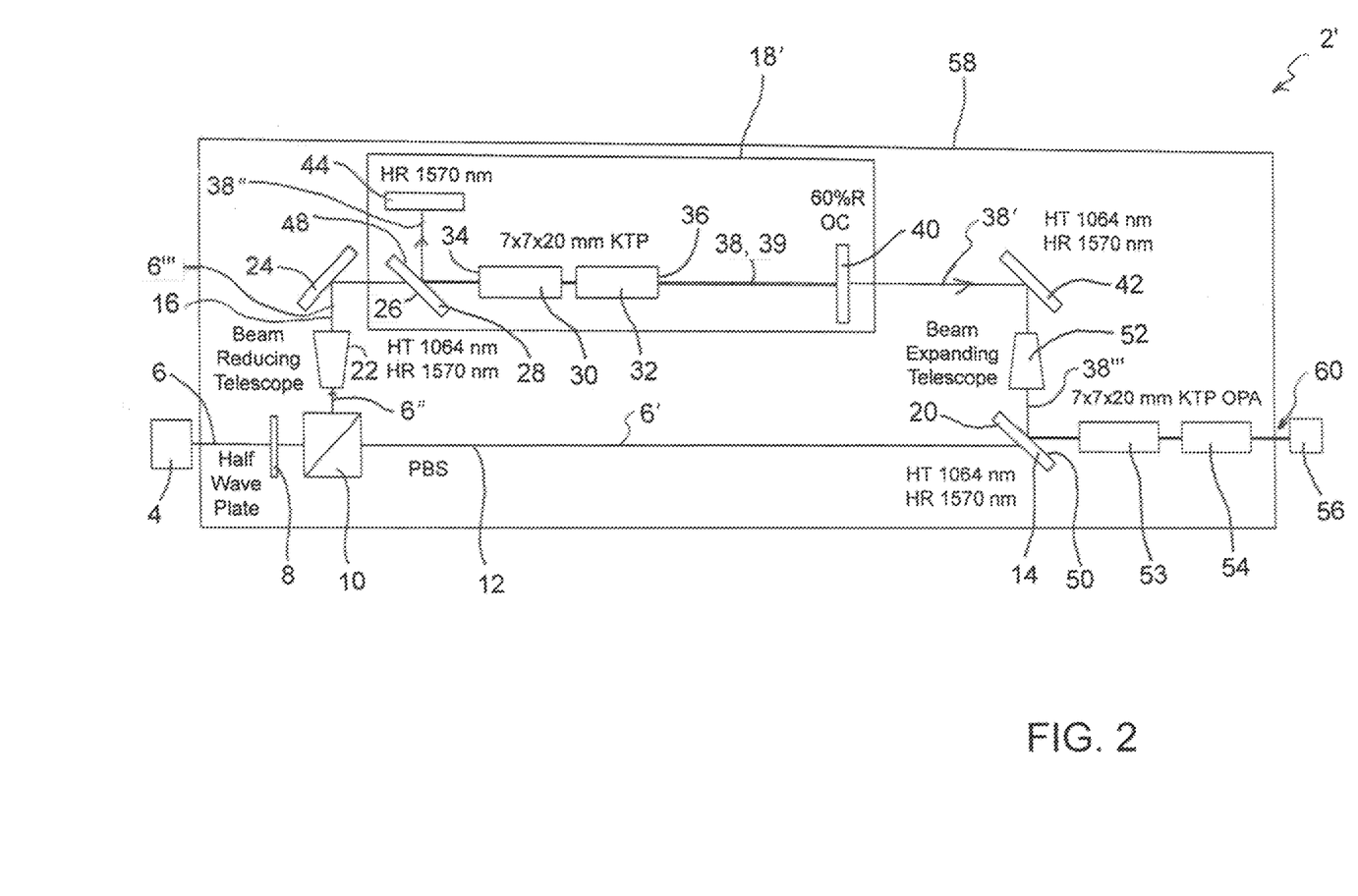
FIG. 2 is a diagrammatic drawing showing the various components of a second embodiment of a stable OPO/OPA hybrid electro-optical system having a linear resonator.

Turning now to FIG. 2, a second embodiment of the present disclosure will now be described. As this embodiment is very similar to the previously discussed embodiment, only the differences between this new embodiment and the previous embodiment will be discussed in detail while identical elements will be given identical reference numerals.

As with the first embodiment, a laser generator or source 4 is provided for generating a desired (e.g., 1064 nm) pump laser beam 6 having at a desired wavelength, e.g., 1064 nm in this example. The generated pump laser beam 6 propagates though a half wave plate 8, which modifies the polarization of the pump laser beam 6 by introducing a phase difference. After passing through the half wave plate 8, the pump laser beam 6 enters an input side of a polarizing beam splitter 10 which splits the pump laser beam 6 into two polarized beams 6', 6". A first portion of the (e.g., 1064 nm) pump laser beam 6', which propagates from the half wave plate 8, is permitted to propagate directly through the polarizing beam splitter 10 along a first OPA laser beam path 12 toward a system dichroic mirror 14 while a remaining second portion of the (e.g., 1064 nm) pump laser beam 6" is reflected by the polarizing beam splitter 10, substantially normal to the first OPA laser beam path 12, along a second OPO laser beam path 16 toward a linear resonator 18', which is discussed hereinafter in further detail.

The first portion of the (e.g., 1064 nm) pump laser beam 6', which is permitted to pass through the polarizing beam splitter 10, eventually propagates along the first OPA laser beam path 12 to an inlet surface 20 of the system dichroic mirror 14 which has substantially the same purpose and function as discussed above with respect to the first embodiment.

As with the previous embodiment, the orientation of the half wave plate 8 is typically adjustable, by an operator (e.g., either manually or by actuation of an adjustment member (not shown in detail) coupled to the half wave plate 8), in order to adjust the amount of the pump laser beam 6 which is permitted to pass directly through the polarizing beam splitter 10 and propagate, as the first portion of the (e.g., 1064 nm) pump laser beam 6', along the first OPA laser beam path 12 toward the inlet surface 20 of the system dichroic mirror 14, as well as the amount of the pump laser beam 6 which is reflected by the polarizing beam splitter 10, along the second OPO laser beam path 16, toward the linear resonator 18' as the second portion of the (e.g., 1064 nm) pump laser beam 6". Typically, the half wave plate 8 is adjustable so as to permit anywhere between 0-100% of the pump laser beam 6 to propagate and pass through the polarizing beam splitter 10 and propagate along the first OPA laser beam path 12 and correspondingly permit anywhere between 100-0% of the pump laser beam 6 to be reflected, by the polarizing beam splitter 10, along the second OPO laser beam path 16.

As noted above, if desired or necessary, a beam expanding telescope (not shown) may be located between the laser generator or source 4 and the half wave plate 8, for example, in order to expand the size of the pump laser beam 6 prior to the pump laser beam entering into the polarizing beam splitter 10 or the half wave plate 8.

The second portion of the (e.g., 1064 nm) pump laser beam 6", which is reflective by the polarizing beam splitter 10 along the second OPO laser beam path 16, then passes through a beam reducing telescope (beam reducer) 22, where a size or diameter of the second portion of the (e.g., 1064 nm) pump laser beam 6" is focused, concentrated or demagnified, e.g., by about four times for example, before being directed toward and reflected by a first (e.g., 1064 nm) highly reflective system mirror 24. The beam reducing telescope 22 demagnifies, reduces or focuses the size of the second portion of the (e.g., 1064 nm) pump laser beam 6", supplied along the second OPO laser beam path 16, in order to create a small spot in the OPO which supports only a single transverse mode. The first (1064 nm) highly reflective system mirror 24 is arranged at a 45 degree angle with respect to the second OPO laser beam path 16. The first (1064 nm) highly reflective system mirror 24 reflects substantially all of the supplied and focused the second portion of the (e.g., 1064 nm) pump laser beam 6'" toward the linear resonator 18'.

The supplied and focused second portion of the (e.g., 1064 nm) pump laser beam 6'", which is reflected by the first (1064 nm) highly reflective system mirror 24, then propagates toward and enters an inlet surface 26 of a resonator beam splitter or a resonator dichroic mirror 28 which permits substantially all of the supplied and focused second portion of the (e.g., 1064 nm) pump laser beam 6'" to pass therethrough and propagate toward a pair of sequentially arranged potassium titanyl phosphate (KTP) crystals 30, 32 of the linear resonator 18'. In this embodiment, the dimensions of the crystals 30, 32 measure 7 mm×7 mm×20 mm. The inlet surface 26 of the resonator dichroic mirror 28 is arranged at a 45 degree angle with respect to the supplied and focused second portion of the (e.g., 1064 nm) pump laser beam 6'" reflected by the first (1064 nm) highly reflective system mirror 24.

The supplied and focused second portion of the (e.g., 1064 nm) pump laser beam 6'" then enters an inlet surface 34 of the first crystal 30, of the pair of sequentially arranged crystals 30, 32, and the supplied and focused second portion of the (e.g., 1064 nm) pump laser beam 6'" propagates completely through first crystal 30 and then the second crystal 32. As the supplied and focused second portion of the (e.g., 1064 nm) pump laser beam 6'" propagates through both the first and the second crystals 30, 32, the supplied and focused second portion of the (e.g., 1064 nm) pump laser beam 6'" is converted, in a conventional manner, into both (1) a signal wavelength beam, e.g., having a wavelength of about 1570 nm for example, and (2) an idler wavelength beam, e.g., having a wavelength of about 3300 nm for example. The combined signal wavelength beam and the idler wavelength beam 38, 39 both then exit via an outlet surface 36 of the second crystal 32, and propagate toward an output coupler 40.

The output coupler 40 is designed to allow a first portion (e.g., 1570 nm) signal wavelength beam 38', e.g., 10 to 90% and more preferably about 40% or so, to pass therethrough and propagate toward a second (1570 nm) highly reflective system mirror 42 while reflecting a second portion (e.g., 1570 nm) signal wavelength beam 38", e.g., 90 to 10% and more preferably about 60% or so, back through the pair of sequentially arranged crystals 32, 30 in the reverse propagation direction. In order to accomplish this, the output coupler 40 is arranged substantially normal to, or at a 90 degree angle, with respect to the propagation path of both the signal wavelength beam and the idler wavelength beam 38 propagating from the first and the second pair of sequentially arranged crystals 30, 32.

The second portion (e.g., 1570 nm) signal wavelength beam 38" eventually propagates, in a reverse travel direction, back through the pair of sequentially arranged crystals 32, 30 and is reflected by an output/reflective surface 48 of the resonator dichroic mirror 28 toward a first (1570 nm) highly reflective linear mirror 44. The first (1570 nm) highly reflective linear mirror 44 is orientated substantially normal to, or at a 90 degree angle, with respect to the propagation path of the reflected second portion (e.g., 1570 nm) signal wavelength beam 38" so that substantially all of the second portion of the (e.g., 1570 nm) signal wavelength beam 38" is reflected back toward the output/reflective surface 48 of the resonator dichroic mirror 28.

The output/reflective surface 48 of the resonator dichroic mirror 28 then reflects substantially all of the second portion (e.g., 1570 nm) signal wavelength beam 38", reflected by the first (1570 nm) highly reflective linear mirror 44, back toward the first and the second pair of crystals 30, 32 along with additionally supplied and focused second portion of the (e.g., 1064 nm) pump laser beam 6" which propagates through the resonator dichroic mirror 28 toward the pair of sequentially arranged crystals 30, 32.

The above process is continuously repeated so that additional supplied and focused second portion of the (1064 nm) pump laser beam 6'" propagates into the ring resonator 18 through the resonator dichroic mirror 28 while only a (minor) portion, e.g., typically less than half, of the (e.g., 1570 nm) signal wavelength beam is permitted to pass through the output coupler 40 and exit from the ring resonator 18 as the first portion of the (e.g., 1570 nm) signal wavelength beam 38' while a major portion, e.g., typically more than half, of the (e.g., 1570 nm) signal wavelength beam remains bouncing back and forth, within the linear resonator 18', between and the output coupler 40 and the first (1570 nm) highly reflective linear mirror 44.

It is to be appreciated that the generated idler wavelength beam 39, e.g., having a wavelength of about 3300 nm for example, gradually dissipates, exits or is eliminated from the system 2'. That is, the generated idler wavelength beam 39 either passes through or is reflected by the output coupler 40, the first (1570 nm) highly reflective linear mirror 44 and/or the output/reflective surface 48 of the resonator dichroic mirror 28 and is absorbed or removed from the system. As a result of this, the generated idler wavelength beam is generally lost and eliminated from the reciprocating back and forth path within the linear resonator 18'.

As noted above, the first portion (e.g., 1570 nm) signal wavelength beam 38', which eventually passes through the output coupler 40, propagates toward the second (1570 nm) highly reflective system mirror 42 which reflects substantially all of the first portion (e.g., 1570 nm) signal wavelength beam 38' toward an outlet/reflective surface 50 of the system dichroic mirror 14. The second (1570 nm) highly reflective system mirror 42 is arranged at a 45 degree angle with respect to the propagation path of the first portion (e.g., 1570 nm) signal wavelength beam 38' which propagates from the output coupler 40.

Prior to the first portion (e.g., 1570 nm) signal wavelength beam 38' being reflected by the outlet/reflective surface 50 of the system dichroic mirror 14, the first portion (e.g., 1570 nm) signal wavelength beam 38' passes through a beam expanding telescope (beam expander) 52, e.g., where about 4 times expansion in the size of the first portion (e.g., 1570 nm) signal wavelength beam 38' occurs, and then the expanded first portion (e.g., 1570 nm) signal wavelength beam 38'" propagates toward the outlet/reflective surface 50 of the system dichroic mirror 14. As the first portion (e.g., 1570 nm) signal wavelength beam 38' passes through the beam expanding telescope 52, the first portion (e.g., 1570 nm) signal wavelength beam 38', generated by the linear resonator 18', is expanded or magnified in order to create a laser beam that has a size or diameter which matches the size or diameter of the first portion of the (e.g., 1064 nm) pump laser beam 6' propagating from the polarizing beam splitter 10 along the first OPA laser beam path 12.

The outlet/reflective surface 50 of the system dichroic mirror 14 then reflects substantially all of the expanded first portion (e.g., 1570 nm) signal wavelength beam 38''' toward a first and a second pair of sequentially arranged amplification crystals 53, 54 in the OPA section of the system 2. In order to accomplish this, the outlet/reflective surface 50 of the system dichroic mirror 14 is arranged at a 45 degree angle with respect to both the first portion of the (e.g., 1064 nm) pump laser beam 6', propagating from the polarizing beam splitter 10 along the first OPA laser beam path 12, as well as the expanded first portion (e.g., 1570 nm) signal wavelength beam 38''' propagating from the beam expanding telescope 52.

As the expanded first portion (e.g., 1570 nm) signal wavelength beam 38''' is reflected by the outlet/reflective surface 50 of the system dichroic mirror 14, the expanded (e.g., 1570 nm) signal wavelength beam is combined with the first portion of the (e.g., 1064 nm) pump laser beam 6' propagating from the polarizing beam splitter 10 along the first OPA laser beam path 12 and through the system dichroic mirror 14. This combined laser beam then propagates toward the pair of sequentially arranged amplification crystals 53, 54 of the system 2'.

The combined laser beam then enters and propagates through the pair of first and second sequentially arranged amplification crystals 53, 54. As the first portion of the (e.g., 1064 nm) pump laser beam 6' propagates though the pair of sequentially arranged amplification crystals 53, 54, the first portion of the (e.g., 1064 nm) pump laser beam 6' creates gain, in a conventional manner, within the pair of sequentially arranged amplification crystals 53, 54. The created gain is, in turn, then utilized by the pair of sequentially arranged amplification crystals 53, 54 in order to amplify the expanded first portion (e.g., 1570 nm) signal wavelength beam 38''', generated by the ring resonator 18, as the expanded first portion (e.g., 1570 nm) signal wavelength beam 38''' propagates through the pair of sequentially arranged amplification crystals 53, 54. The amplification of the expanded first portion (e.g., 1570 nm) signal wavelength beam 38''' results in an improved beam having a gain that is typically on the order of about 10 times or greater than the quality of the expanded first portion (e.g., 1570 nm) signal wavelength beam 38'. Such amplification of the expanded first portion (e.g., 1570 nm) signal wavelength beam 38''' thereby results in a high energy output signal, as generally shown in FIG. 4, for propagation toward a desired object or target 56.

As generally shown in FIG. 2, system can be designed as a module 58' which includes the half wave plate 8, the polarizing beam splitter 10, the system dichroic mirror 14, the beam reducing telescope 22, the first highly reflective system mirror 24, the linear resonator 18', the second (1570 nm) highly reflective system mirror 42, the beam expanding telescope 52, and the pair of sequentially arranged amplification crystals 53, 54. The module 58' can be used to modify existing laser systems in order to improve the beam quality and thereby achieve a high energy output signal for such existing systems. Alternatively, the half wave plate 8, the polarizing beam splitter 10, the system dichroic mirror 14, the beam reducing telescope 22, the first highly reflective system mirror 24, the linear resonator 18', the second (1570 nm) highly reflective system mirror 42, the beam expanding telescope 52, and the pair of sequentially arranged amplification crystals 53, 54 may be incorporated, along with a laser generator or source 4 and an outlet aperture 60, for propagation of the high energy output signal toward a desired object or target 56, into a complete hybrid resonator and amplifier system 2', as generally shown in FIG. 2.

Figure 5:
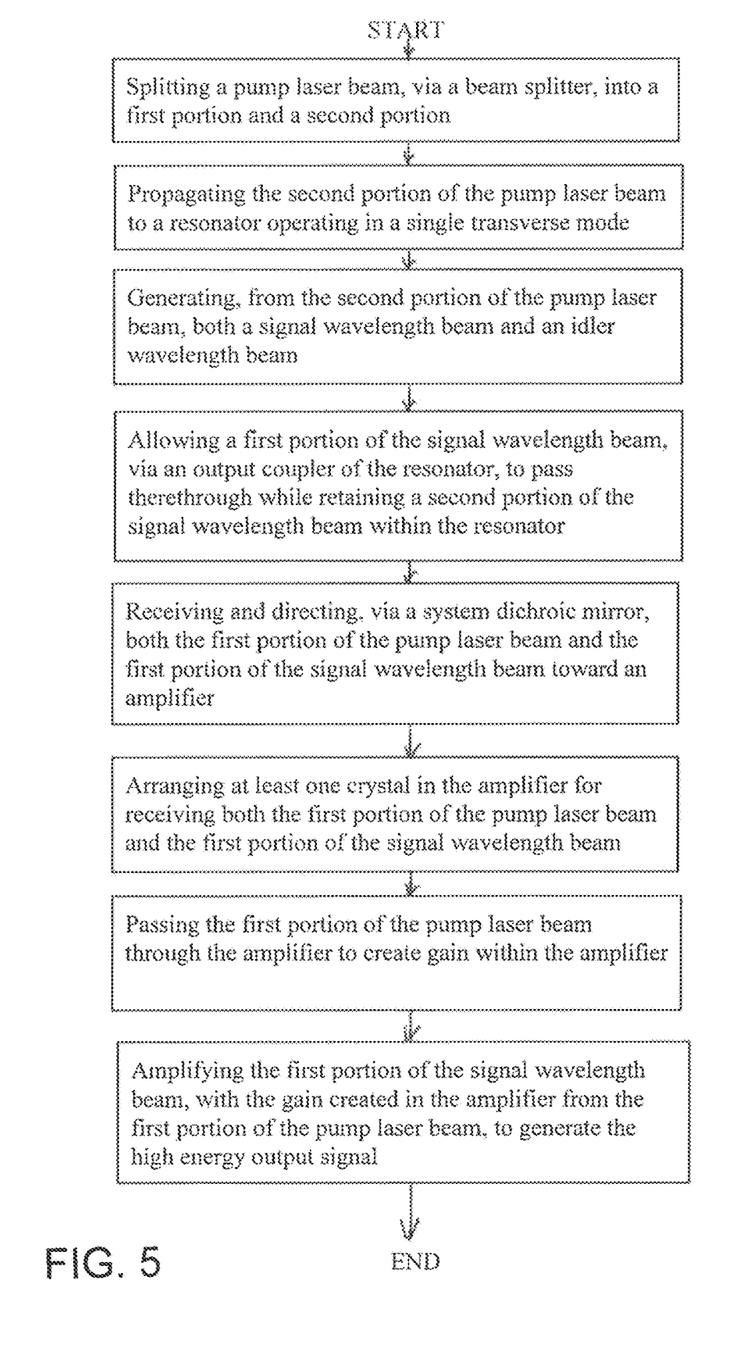
FIG. 5 is a diagrammatic view showing the method according to the present disclosure.

FIG. 5 diagrammatically shows the various steps involved in practice of the method according to the disclosure.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Wherefore, we claim:

1. A hybrid resonator and amplifier combination for generating a high energy output signal, the hybrid resonator and amplifier combination comprising:
a beam splitter for splitting a pump laser beam into a first portion pump laser beam and a second portion pump laser beam;
the second portion pump laser beam being propagated to a resonator having at least one crystal, and the resonator operating in a single transverse mode for generating, from the second portion pump laser beam, both a signal wavelength beam and an idler wavelength beam, and the resonator having an output coupler which allows a first portion signal wavelength beam to pass therethrough while retaining a second portion signal wavelength beam within the resonator;
the resonator having a Fresnel number less than 1 to generate diffraction limited output;
a system dichroic mirror for receiving and directing both the first portion pump laser beam and the first portion signal wavelength beam toward an amplifier; and
the amplifier, having at least one crystal, being arranged for receiving both the first portion pump laser beam and the first portion signal wavelength beam, and the first portion pump laser beam, upon passing through the amplifier, creating gain within the amplifier, and the amplifier amplifying the first portion signal wavelength beam, with the gain created from the first portion pump laser beam, to generate the high energy, diffraction liquid output signal.

2. The hybrid resonator and amplifier combination according to claim 1, wherein a half wave plate is provided for introducing a phase change into the pump laser beam so that the pump laser beam, after passing through the half wave plate, is split by the beam splitter into the first portion pump laser beam and the second portion pump laser beam.

3. The hybrid resonator and amplifier combination according to claim 2, wherein the second portion pump laser beam propagates toward and passes through a beam reducing telescope which concentrates the second portion pump laser beam, and then the concentrated second portion pump laser beam propagates through a resonator beam splitter into the resonator.

4. The hybrid resonator and amplifier combination according to claim 3, wherein the first portion signal wavelength beam, which passes through the output coupler, propagates toward a beam expanding telescope which expands the first portion signal wavelength beam, and the expanded first portion signal wavelength beam then propagates toward a reflective surface of the system dichroic mirror which reflects substantially all of the expanded first portion signal wavelength beam toward the amplifier.

5. The hybrid resonator and amplifier combination according to claim 4, wherein the resonator comprises a pair of sequentially arranged potassium titanyl phosphate crystals, and each of the pair of crystals measures 7 mm×7 mm×20 mm.

6. The hybrid resonator and amplifier combination according to claim 4, wherein the amplifier comprises a pair of sequentially arranged potassium titanyl phosphate crystals, and each of the pair of crystals measures 7 mm×7 mm×20 mm.

7. The hybrid resonator and amplifier combination according to claim 4, wherein a first highly reflective system mirror reflects the concentrated second portion pump laser beam, from the beam reducing telescope, toward an inlet surface of the resonator beam splitter.

8. The hybrid resonator and amplifier combination according to claim 4, wherein a second highly reflective system mirror reflects the first portion signal wavelength beam, from the output coupler, toward the beam expanding telescope.

9. The hybrid resonator and amplifier combination according to claim 4, wherein resonator comprises a ring resonator which includes a pair of sequentially arranged crystals located between the system dichroic mirror and the output coupler,
the output coupler is arranged at a 45 degree angle with respect to at least the signal wavelength beam while the system dichroic mirror is arranged at a 45 degree angle with respect to the concentrated second portion of the pump laser beam;
a first highly reflective resonator mirror is arranged at a 45 degree angle with respect to the second portion signal wavelength beam propagating from the output coupler;
a second highly reflective resonator mirror is arranged at a 45 degree angle with respect to the second portion of the signal wavelength beam reflected from the highly reflective resonator mirror; and
the second highly reflective resonator mirror reflects substantially all of the second portion signal wavelength beam toward an outlet/reflective surface of the resonator dichroic mirror.

10. The hybrid resonator and amplifier combination according to claim 4, wherein resonator comprises a linear resonator which includes a pair of sequentially arranged crystals located between the system dichroic mirror and the output coupler,
the output coupler is arranged at a 90 degree angle with respect to at least the signal wavelength beam while the system dichroic mirror is arranged at a 45 degree angle with respect to the concentrated second portion of the pump laser beam;
the output coupler reflects the second portion of the signal wavelength beam back through pair of sequentially arranged crystals and toward the system dichroic mirror for reflection; and
a first highly reflective resonator mirror is arranged at a 90 degree angle with respect to the second portion of the signal wavelength beam reflected by the system dichroic mirror so that the first highly reflective resonator mirror reflects substantially all of the second portion of the signal wavelength beam back toward the system dichroic mirror for again passing through the pair of sequentially arranged crystals.

11. The hybrid resonator and amplifier combination according to claim 1, wherein resonator has a plurality of sequentially arranged crystals for minimizing a buildup time of the second portion of the signal wavelength beam within the resonator.

12. The hybrid resonator and amplifier combination according to claim 1, wherein amplifier has a plurality of sequentially arranged crystals for maximizing the high energy output signal achieved by the amplifier.

13. The hybrid resonator and amplifier combination according to claim 5, wherein the hybrid resonator and amplifier combination includes a laser source for generating the pump laser beam having at a desired wavelength.

14. The hybrid resonator and amplifier combination according to claim 2, wherein the beam splitter, the resonator, the system dichroic mirror and the amplifier are formed together with one another as a unitary module.

15. The hybrid resonator and amplifier combination according to claim 3, wherein the beam reducing telescope concentrates the second portion of the pump laser beam to have a size which is about ¼ of a size of the second portion of the pump laser beam.

16. The hybrid resonator and amplifier combination according to claim 4, wherein the beam expanding telescope expands the first portion signal wavelength beam to increase a size of the first portion of the signal wavelength beam by a factor of about four times.

17. The hybrid resonator and amplifier combination according to claim 1, wherein resonator comprises a linear resonator which includes a plurality of sequentially arranged crystals for minimizing a buildup time of the second portion signal wavelength beam signal within the resonator.

18. The hybrid resonator and amplifier combination according to claim 1, wherein the pump laser beam has a wavelength of about 1064 nm, and the signal wavelength beam has a wavelength of about 1570 nm.

19. A method of generating a high energy output signal with a hybrid resonator and amplifier combination, the method comprising:
splitting a pump laser beam, via a beam splitter, into a first portion pump laser beam and a second portion pump laser beam;
propagating the second portion pump laser beam to a resonator having at least one crystal, and the resonator having a Fresnel number less then 1 to generate diffraction limited output and operating in a single transverse mode to generate, from the second portion pump laser beam, both a signal wavelength beam and an idler wavelength beam, and allows a first portion signal wavelength beam, via an output coupler of the resonator, to pass therethrough while retaining a second portion signal wavelength beam within the resonator;

receiving and directing, via a system dichroic mirror, both the first portion pump laser beam and the first portion signal wavelength beam toward an amplifier;

arranging at least one crystal in the amplifier for receiving both the first portion pump laser beam and the first portion signal wavelength beam;

passing the first portion pump laser beam through the amplifier to create gain within the amplifier; and amplifying the first portion signal wavelength beam, with the gain created in the amplifier from the first portion pump laser beam, to generate the high energy, diffraction limited output signal.

20. A hybrid resonator and amplifier combination for generating a high energy output signal, the hybrid resonator and amplifier combination comprising:

a beam splitter for splitting a pump laser beam into a first portion pump laser beam and a second portion pump laser beam;

the second portion pump laser beam being propagated to a resonator having at least one crystal, and the resonator having a Fresnel number less than 1 to generate diffraction limited output and operating in a single transverse mode for generating, from the second portion pump laser beam, both a signal wavelength beam and an idler wavelength beam, and the resonator having an output coupler which allows a first portion signal wavelength beam to pass therethrough while retaining a second portion signal wavelength beam within the resonator;

wherein resonator includes crystals located between the system dichroic mirror and the output coupler, the system dichroic mirror is arranged at a 45 degree angle with respect to the concentrated second portion of the pump laser beam;

the output coupler reflects the second portion of the signal wavelength beam back through the crystals and toward the system dichroic mirror for reflection; and the first highly reflective resonator mirror reflects substantially all of the second portion of the signal wavelength beam back toward the system dichroic mirror for again passing through the crystals; and the amplifier, having at least one crystal, being arranged for receiving both the first portion pump laser beam and the first portion signal wavelength beam, and the first portion pump laser beam, upon passing through the amplifier, creating gain within the amplifier, and the amplifier amplifying the first portion signal wavelength beam, with the gain created from the first portion pump laser beam, to generate a high energy, diffraction limited output signal.

* * * * *